Nov. 30, 1948.    J. HOHL    2,455,175
CAPPING MACHINE
Filed Aug. 25, 1944
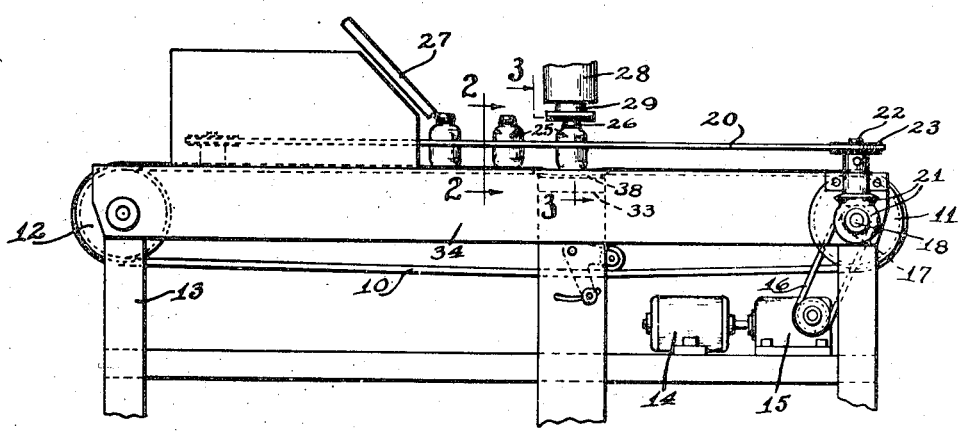
Fig. 1.
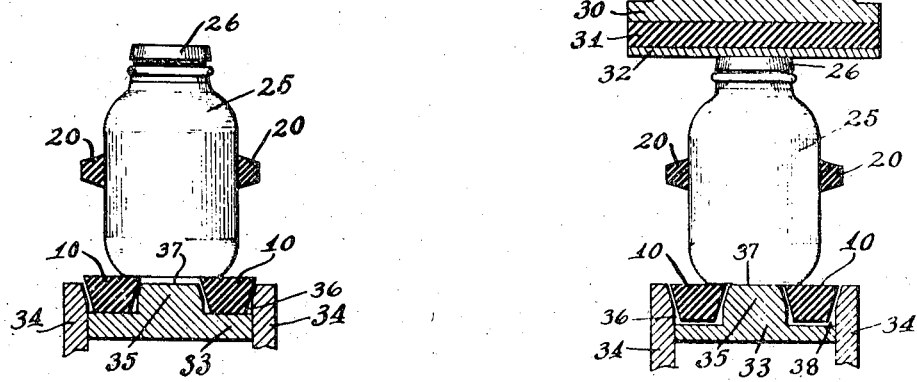
Fig. 2.
Fig. 3.
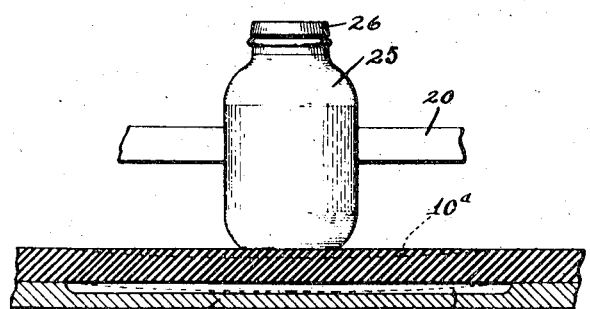
Fig. 4.
Inventor
JOHN HOHL
By Rule and Hoge
Attorneys Patented Nov. 30, 1948

2,455,175

UNITED STATES PATENT OFFICE 2,455,175

CAPPING MACHINE

John Hohl, Toledo, Ohio, assignor to Owens-Illinois Glass Company, a corporation of Ohio Application August 25, 1944, Serial No. 551,169

7 Claims. (Cl. 226—78)

My invention relates to a machine for applying and securing caps or closure devices to jars and other containers.

The invention is embodied in a machine of the type in which the containers are carried by a traveling conveyor through a sealing station at which the caps or closures which have been loosely placed on the containers, are forced downward into sealing position by a reciprocating ram or the like. During such operation, the jars are momentarily arrested in their forward travel while subjected to the downward pressure of the ram.

An object of the present invention is to provide improved means by which the jars are caused to instantaneously resume their forward travel with the conveyor when the downward pressure is relieved, and are quickly accelerated to the speed of the conveyor, thereby permitting a continuous row of jars to be sealed in rapid succession and preventing the oncoming jars from gaining on the container which is being sealed. In this manner progressive bunching or accumulation of the jars ahead of the sealing station is prevented.

A further object of the invention is to provide improved means for providing a solid bottom support for the jar while subjected to the downward pressure of the sealing ram, without interfering with the free movement of the conveyor, in combination with means for maintaining an adequate forward pull on the jar by which it is instantly started and accelerated when the sealing pressure is relieved.

Other objects of the invention will appear hereinafter.

Referring to the accompanying drawings:

Fig. 1 is a side elevation of an apparatus embodying the present invention.

Fig. 2 is a section at the line 2—2 on Fig. 1, on a larger scale, showing the conveyor and a jar thereon at a point in advance of the sealing station.

Fig. 3 is a similar sectional view at the line 3—3 on Fig. 1, showing the jar at the sealing station and a sealing ram.

Fig. 4 is a fragmentary part sectional side elevation of the conveyor and a container at the sealing station.

The present application is a continuation-in-part of my copending application S. N. 468,095, filed December 7, 1942, for Capping machines on which Patent No. 2,357,826 was granted September 12, 1944.

Referring to the accompanying drawings, the machine comprises a horizontally traveling endless double strand conveyor 10 running on driving and driven pulleys 11 and 12 respectively, said pulleys being mounted in a supporting framework 13. The conveyor is driven continuously and at a constant speed by an electric motor 14 having driving connections with the pulley 11 through speed reduction gearing 15, a belt 16, and a pulley 17 on the shaft 18 of the drive pulley 11. Side belts 20 parallel with the belt conveyor 10 and spaced thereabove, are driven from the shaft 18 through bevel gears 21, shaft 22, and pulley 23. The belts 20 are spaced horizontally to receive the jars 25 or other containers therebetween. The belts 10 and 20 consist of resilient compressible material such as rubber or rubber composition so that they can frictionally engage the containers and exert a forward pull thereon.

The closure caps 26 for the containers may be fed down a chute 27 from which they are automatically drawn by the advancing containers and held loosely on the containers. The means for forcing the caps downward for sealing or tightening them on the containers comprises a ram 28. The ram includes a plunger 29 and is provided with a presser foot 30 which may include a section or disk 31 of resilient material and a surface plate 32 of sheet metal or other material. The ram is operated in synchronism with positioning of the containers therebeneath by the travel of the conveyor.

The conveyor belts 10 are supported on a conveyor frame including a bottom plate or bar 33, extending lengthwise beneath the belt, and side bars 34. The bar 33 is formed with a rib 35 extending lengthwise thereof. The rib 35 is spaced from the side bars 34 to provide channels 36 for the belts 10. The upper surface 37 of the rib 35 preferably is on a level with the upper surfaces of the side bars 34. The channels 36 are of somewhat less depth than the belt 10 so that the latter protrudes a short distance above the surface 37 in the position to receive and support the jars.

Each of the channels 36 has a longitudinal portion thereof of increased depth, providing an elongated undercut or open space 38 extending lengthwise beneath the belt. This portion of the channel extends through the sealing zone and for a substantial distance beyond the sealing station in both directions. The channels 36 are thus of sufficient length to permit the containers 25 to depress belts 10 without materially stretching or lengthening the belts or interfering with their continuous forward movement, when the sealing pressure is applied, as indicated at 10ᵃ (Fig. 4). The belts while thus depressed are spaced a short distance above the underlying surface of the supporting bar 33.

The operation is as follows:

The jars 25 are placed on the conveyor belts 10 and carried forward thereby through the sealing station in rapid succession. As each jar passes beneath the chute 7 it receives a cap 26 therefrom. As the jar, with the cap loosely seated thereon, moves beneath the ram 28 at the sealing station, the plunger is lowered so that the presser foot 30 forces the cap vertically downward on the jar and seals the latter. During the initial portion of this sealing movement, the jar is advancing with the conveyor belts so that there is a sliding movement of the cap on the under surface of the plate 32, the friction between said cap and plate being insufficient to immediately stop the jar. During this downward movement of the plunger, the pressure applied through the jar, lowers the belts and the jar seats on the surface 37. The rib 35 now forms a solid support for the jar during the final downward movement of the plunger, the pressure being greatly increased for an instant as this downward movement is being completed. This increased pressure is sufficient to stop the jar momentarily while the belts 10 and 20 continue their forward travel. When the plunger 29 completes its downward movement, it is immediately reversed and quickly moved upward so that the heavy pressure continues only for an instant. The belts 20 are in frictional contact with the container 25 and exert considerable pressure thereon so that the instant the downward pressure of the plunger is reduced, the container is moved forward by the frictional pull of belts 20 supplemented by that of the conveyor belts 10. The deepened portions 38 of the channels 36 permit the belts 10 to yield downwardly and thus prevent any excessive pressure being applied thereto by the sealing ram. The conveyor is thus left free for forward travel without whipping or irregular movement such as would be produced by a heavy intermittent downward pressure thereon by the ram.

Modifications may be resorted to within the spirit and scope of my invention.

I claim:

1. The combination of an endless conveyor comprising a pair of parallel-spaced conveyor belts, a horizontally-disposed stationary conveyor frame along which the belts travel, said frame including a spacing rib extending longitudinally thereof between the belts with the upper surface of the rib a slight distance below the surface level of the belts, a ram positioned over the conveyor and spaced therefrom to permit the passage of the jars with caps loose thereon to a capping position between the conveyor and ram, and means for reciprocating the ram vertically and forcing the caps into position on the jars, said conveyor belts being under tension and yieldable downward under the pressure applied thereto through the jars and thereby permitting each jar to be supported directly on said rib while under said downward pressure, said conveyor frame having belt supporting surfaces extending lengthwise beneath the belt at opposite sides of the capping position and terminating short of the capping position, the belts being free from bottom support within the capping zone to permit said downward yielding thereof.

2. The combination of an endless horizontally traveling conveyor belt consisting of a continuous piece of resilient elastic compressible material of uniform cross section throughout its length, means for continuously driving said belt and thereby carrying containers thereon through a capping station, a conveyor frame extending lengthwise of said belt and having surfaces beneath and forming a bottom support for the traveling belt, means at the capping station for applying a downward pressure on caps loosely placed on the containers and thereby forcing the caps downwardly to position on the containers and applying downward pressure on the containers, means at said station forming a solid bottom beneath the container at said station, the surface of said bottom being slightly below the level of the conveyor belt, said belt supporting surfaces of the conveyor frame terminating at points spaced from and at opposite sides of said station, the portion of the belt extending between said points being free from bottom support and held in line by the tension of the belt and also being yieldable under downward pressure, whereby downward pressure on a container at said station causes it to flex the conveyor belt downwardly, seats the container on said bottom surface at said station, and arrests the container while the conveyor belt continues its travel.

3. The combination of a horizontally traveling endless conveyor belt, means for driving it and thereby carrying containers thereon in succession through a capping station, a ram at said station directly over the path of the containers and movable downwardly for forcing a cap into position on a container, a conveyor frame having belt supporting surfaces beneath the belt and extending lengthwise thereof on opposite sides of said station, means on said frame providing a container supporting surface directly beneath the ram and at a slightly lower level than the upper surface of the belt, said belt supporting surfaces having their inner ends at opposite sides of and spaced from the capping station, leaving the under surface of that portion of the belt between said belt supporting surfaces free from bottom support, whereby downward pressure of the ram flexes the belt downwardly in the zone of said capping station and seats the container on said container supporting surface, permitting an increased downward pressure on the cap for forcing it into position on the container, and means positioned above and separate from the conveyor belt for applying a driving force to the container in the direction of travel of the conveyor while the container is within the capping zone and thereby quickly accelerating the container when the downward pressure thereon is relieved.

4. The combination of a horizontally traveling endless conveyor belt, means for driving it and thereby carrying containers thereon in succession through a capping station, a ram at said station directly over the path of the containers and movable downwardly for forcing a cap into position on a container, a conveyor frame having belt supporting surfaces beneath the belt and extending lengthwise thereof on opposite sides of said station, means on said frame providing a container supporting surface directly beneath the ram and at a slightly lower level than the upper surface of the belt, said belt supporting surfaces having their inner ends at opposite sides of and spaced from the capping station, leaving the under surface of that portion of the belt between said belt supporting surfaces free from bottom support, whereby downward pressure of the ram flexes the belt downwardly in the zone of said capping station and seats the container on said container supporting surface, permitting an increased downward pressure on the cap for forcing it into position on the container, side belts positioned above said conveyor belt and spaced apart in position to frictionally engage the opposite sides of the container while the latter is in the capping zone, and means for continuously driving said side belts in the direction of travel of said conveyor belt and at the same speed as the conveyor belt and thereby exerting a forward pull on the container.

5. The combination of a conveyor comprising a pair of horizontally-spaced endless parallel belts, means for continuously driving said belts and thereby carrying containers thereon in succession through a capping station, each said belt consisting of a continuous piece of flexible, elastic, resilient, compressible material of substantially uniform cross section throughout its length and presenting an uninterrupted upper surface travelling through the capping station, a ram at said station having a presser foot positioned directly over the path of the containers and movable up and down for forcing a cap into place on each container as the latter is brought to said station, and a stationary conveyor frame extending lengthwise of said belts and formed with channels therein in which the belts run, said channels being of slightly less depth than the said belts and providing bottom supports for the belts, whereby the belts and the containers supported on the belts are spaced above the conveyor frame, the floors of said channels having non-supporting surface portions extending through the zone of the capping station at a lower level than said bottom supports, said non-supporting surface portions extending a substantial distance beyond the capping station in both directions, and thereby leaving the belts without bottom support along said zone and permitting the belts to be flexed downwardly by the containers when pressure is applied thereto by said ram, said frame having a container supporting surface positioned to provide a solid bottom support for the containers while downward pressure is being applied thereto by the ram.

6. The combination of a horizontally-disposed endless conveyor belt, means for driving said belt horizontally at a constant speed and thereby carrying a container thereon through a capping station, a stationary conveyor frame formed with a channel extending lengthwise of the belt and in which the latter runs, a ram at said station positioned over the path of the container and movable downwardly to force a cap on the container when the latter reaches the capping station, said frame having a container supporting surface at said station at a level slightly beneath the upper surface level of the conveyor belt, the portion of the floor of said channel extending from the zone of the capping station being at a level to provide a bottom supporting surface for the conveyor belt, the portion of the floor within said zone being at a lower level, thereby leaving the portion of the belt traversing said zone without bottom support and permitting the belt to be flexed downwardly and the container to be seated on said container supporting surface when the container is forced downwardly by the ram, and friction means at the capping station for exerting a force on each container in the direction of its travel while within said zone, said friction means being spaced above the said conveyor belt and positioned and arranged to engage the container at points above the bottom thereof.

7. The combination of a conveyor comprising a pair of horizontally-spaced endless parallel belts, means for continuously driving said belts and thereby carrying containers thereon in succession through a capping station, a ram at said station having a presser foot positioned directly over the path of the containers and movable up and down for forcing a cap into place on each container as the latter is brought to said station, a stationary conveyor frame extending lengthwise of said belts and formed with channels therein in which the belts run, said channels being of slightly less depth than the said belts and providing bottom supports for the belts, whereby the belts and the containers supported on the belts are spaced above the conveyor frame, the floors of said channels having non-supporting surface portions extending through the zone of the capping station at a lower level than said bottom supports, said non-supporting surface portions extending a substantial distance beyond the capping station in both directions, and thereby leaving the belts without bottom support along said zone and permitting the belts to be flexed downwardy by the containers when pressure is applied thereto by said ram, said frame having a container supporting surface positioned to provide a solid bottom support for the containers while downward pressure is being applied thereto by the ram, flexible side belts positioned over said conveyor belts and extending lengthwise thereof in position to frictionally engage the containers, and means for driving said side belts at the speed and in the direction of travel of said conveyor belts.

JOHN HOHL.

REFERENCES CITED

The following references are of record in the file of this patent:

UNITED STATES PATENTS

| Number | Name | Date |
| --- | --- | --- |
| 1,010,828 | Vaughn | Dec. 5, 1911 |
| 1,781,750 | Dodge et al. | Nov. 18, 1930 |
| 2,296,013 | Bell | Sept. 15, 1942 |
| 2,352,763 | Bell | July 4, 1944 |